United States Patent
Hohman et al.

[15] 3,639,135
[45] Feb. 1, 1972

[54] METHOD OF ADHERENTLY BONDING NEOPRENE TO METAL

[72] Inventors: Alvin E. Hohman, Dallas, Tex.; William L. Kennedy, Kansas City, Mo.

[73] Assignee: LTV Aerospace Corporation, Dallas, Tex.

[22] Filed: June 3, 1968

[21] Appl. No.: 733,803

[52] U.S. Cl................................117/10, 117/63, 117/75, 117/79, 117/132 BE
[51] Int. Cl..................B32b 15/06, B32b 15/08, B44d 1/14
[58] Field of Search......................117/75, 79, 10, 63, 62, 66, 117/120, 132 BE, 132 CB

[56] References Cited

UNITED STATES PATENTS

| | | | |
|---|---|---|---|
| 2,522,136 | 9/1950 | Schaffer | 117/79 |
| 2,581,920 | 1/1952 | Kuhn | 117/132 CB |
| 2,976,256 | 3/1961 | Whittier et al. | 117/132 BE X |
| 3,425,886 | 2/1969 | Heins | 117/75 X |

*Primary Examiner*—William D. Martin
*Assistant Examiner*—Ralph Husack
*Attorney*—H. C. Goldwire

[57] ABSTRACT

Disclosed is a method of adherently bonding a neoprene (polychloroprene) composition to a metal substrate comprising the use of a primer containing a chlorinated rubber and an epoxy resin. A liquid neoprene composition is applied to the dried primer, the composition and the primer are intermixed to redissolve the primer, and the resultant coating is dried and cured.

6 Claims, No Drawings

METHOD OF ADHERENTLY BONDING NEOPRENE TO METAL

This invention relates to multilayer polymeric coatings for protecting metal surfaces from severe marine environments, and more particularly to a method of applying such coatings in liquid form so that they are strongly and permanently adherent.

Cost considerations generally compel the use of low-alloy, carbon steel or other common metal as construction material for rudders of ocean vessels, foils, and struts of seagoing hydrofoil craft, and the like. Elements required to operate in a severe marine environment are subject to rapid degradation and possible destruction by a combination of impingement-erosion, cavitation-erosion, and chemical corrosion.

Impingement-erosion refers to the erosive effects of the physical contact on the surface of an article by water flowing with respect to the article. This includes wear due to skin friction as well as damage caused by particles carried by the flow of water. The term cavitation describes the formation of cavities or bubbles within water in motion or at the boundary surface of a solid and flowing water when the pressure in the water is reduced to a critical value, without a change in temperature. Cavitation occurs, by way of example, in hydraulic machines such as turbines, pumps, and propellers, and on submerged hydrofoils. This type of cavitation can cause rapid erosion of the boundary surfaces, even though these surfaces consist of hard and normally durable material. The destructive effect of cavitation may be ascribed in substantial part to the enormous force exerted on the surface by the impingement and collapse of the highly evacuated cavities. Chemical corrosion refers primarily to the electrochemical degradation to which metals are subjected in the presence of electrolytes, e.g., salt water. To protect against these destructive effects, a coating system is required which will enable the metal to provide satisfactory marine service under these extremely demanding conditions.

Several coating systems, including primers such as epoxy-polyamide, epoxy-polyurethane, epoxy-coal tar, epoxy-phenolic, neoprene-phenolic, vinyl-phenolic, urethane and vinyl wash primer, polymeric top coats such as neoprene (polychloroprene) polyurethane, vinyl rubber elastomers, and phenolic-modified rubber elastomers, as well as various surface preparation techniques have been evaluated. One top coating in particular, liquid neoprene, has shown itself to be exceptionally effective and durable. Hitherto, however, no method has been known for strongly and permanently bonding liquid neoprene to a metal surface. While some state-of-the-art methods can achieve good initial adherence, exposure of the coating to sea water causes rapid deterioration.

Accordingly, it is an object of the invention to provide a coating system which will enable a low cost metal, such as carbon steel, to provide satisfactory service under severe marine conditions.

Another object of the invention is to provide a method of strongly and permanently bonding liquid neoprene coating to a metal surface.

In accordance with the present invention, a neoprene coating is adherently bonded to a metal surface by cleaning and preparing the surface in a conventional manner, applying a primer containing a minor portion of chlorinated rubber and a substantial portion of an epoxy resin to a critical thickness, allowing the primer to dry for a specified time, and then applying to the primer a liquid neoprene rubber composition containing an amount of a solvent capable of dissolving the primer which has been allowed to dry, and intermixing the neoprene composition with the primer so as to redissolve substantially all of it.

The method of the invention provides a neoprene coating adherently bonded to a metal for use where high intensity cavitation-erosion, as well as impingement-erosion, are found. The coating cures at room temperature, and is readily applied to surfaces having both simple and compound curvature.

The initial step in preparation of the substrate, e.g., steel, for application of the coating is silica sand blasting the surface to bright metal to remove mill scale, corrosion, and other foreign matter. A suitable peak-to-valley distance can be obtained using military specification number MIL-S-17726A, Class 1 grit at a pressure of 90 to 100 p.s.i.g. If the coating operations are started immediately after grit blasting, no further cleaning is required except the removal of residual grit using clean, dry air at 90 to 110 p.s.i.g. However, it is considered desirable also to solvent-wipe the surface to remove any residual contamination. Acrylic nitrocellulose lacquer thinner and 1, 1, 1 trichloroethane are examples of satisfactory cleaners, and are preferably applied by wiping the surface with clean rags wet with the solvent. Before the cleaner dries, the surface is rewiped using clean dry cloths, and then air dried. If the surface is thus solvent wiped, light "tack ragging" (use of a tacky rag to remove loose particles) is recommended before priming.

Next, any of the family of so-called wash primers is applied to the substrate to improve adhesion and reduce interface corrosion. A satisfactory primer for this purpose in U.S. Navy Formula 117 Wash Primer, which is a polyvinylbutyral-phosphoric acid-zinc tetroxy chromate primer. The primer is applied by brush or spraying to a thickness between 0.2 to 0.5 mil and allowed to air dry at least 1 hour but no more than 24 hours. While the application of a wash primer is highly desirable, this step can be omitted without seriously affecting the results.

Next, the main primer is applied, which contains a minor portion of a chlorinated rubber and a major portion of an epoxy resin, and preferably further contains corrosion inhibiting pigments such as red iron oxide pigment and lead silicochromate pigment. A commercially available primer comprising a minor portion of a major portion of chlorinated rubber, epoxy resin, a minor portion of inorganic pigments including red iron oxide, and lead silicochromate and which has been used with very satisfactory results in the present invention is sold by the Gates Engineering Company, Wilmington, Delaware, a division of the Glidden Company, under the designation Gaco N-18-F primer, formulation number KV-20934.

Agitation and mixing of the main primer must be accomplished using a paint shaker, and not by stirring, since air and moisture cause the material to cure. Containers of the primer should be well sealed when not in use. After an initial agitation of the primer, 1 volume of toluene is added to 4 volumes of the primer and mixed thoroughly on a paint shaker.

If the wash primer was applied by spraying, it may be necessary to rub the surface with Kraft paper and "tack rag" it immediately before applying the main primer. A light coat of the main primer thinned 1:4 as described above is applied over the wash primer, preferably by brushing, to a thickness which does not quite hide the wash primer. Rebrushing over the applied primer should be avoided. The dried film thickness of the main primer must be from 0.2 mil to 0.3 mil. Preferably, an average thickness of 0.25 ±0.05 mil is maintained. The coating of main primer is allowed to dry in air from a minimum of 2 hours. Air drying for 16 to 24 hours is not detrimental to the final results; however, the 2-hour air dry is preferred.

The next step is to apply the first of a series of coats of liquid neoprene, each coat being of the order of 1 or 2 mils, until a resulting top coat of the desired thickness is achieved, such as, for example, 40 mils. The first layer of top coat consists, for example, of Gaco HFC-55, which is a moisture-curing liquid neoprene (polychloroprene) that cures at room temperature by absorbing moisture from the surrounding air. This product of the Gates Engineering Company, identified by formulation number KV-19110, has a specific gravity of 1.2297, weighs 10.26 pounds/gallon, contains 47.84 percent by weight solids, or 22.91 percent by volume solids, and has a pigment concentration of 29.17 percent by volume. The composition comprises a processed gumstock consisting of neoprene, a blend of anatase and rutile titanium dioxides, zinc oxide, a stable noncorrosive lead compound and antioxidant dispersed in a blend of solvents (generally comprising aromatics, aliphatics, naphthenics, nitroparaffin, ketones, and an alcohol) to which a stabilizing agent and a cure accelerator are added.

The neoprene coating is applied with the aid of a suitable quantity of solvent in a rather critical manner as explained below. There is added to the Gaco HFC-55 composition a quantity of an appropriate solvent such that almost all—if not all—of the chlorinated rubber-epoxy resin primer which has been allowed to dry is redissolved when the diluted HFC-55 composition is applied. In other words, the top coat composition contains an amount of an appropriate solvent which is in excess of the quantity which is required merely to dissolve the solids of the top coat composition, such that substantially all of the dried primer is redissolved by the excess solvent comprising the top coat composition. It will, of course, be apparent that the coating solvent must also be a solvent for the dried primer; but otherwise the selection of a solvent is not critical. Xylene is preferred for the coating solvent because it is chemically related to toluene (the primer solvent), it is a solvent for both the selected top coating and the primer, and it evaporates at a rate which is slow enough to permit sufficient brushing action to insure mixing of the two components.

The precautions concerning opening and sealing of containers and agitation and mixing discussed above for the main primer also apply to Gaco HFC-55. After the liquid neoprene composition has been shaken, one volume of a solvent, for example xylene, is combined with 3 to 6 volumes of the Gaco HFC-55 and mixed thoroughly to produce a composition containing from 80.5 percent through 82.8 percent by volume solvent. Best results are obtained when 1 volume of the solvent is added to 4 volumes of the Gaco HFC-55 and mixed thoroughly to produce a composition containing 81.7 percent by volume solvent.

Although the reasons for the improved adhesion are not fully understood, it is known that the adhesion of the entire coat is directly related to the intermixing obtained between the main primer and the first coat of HFC-55. Furthermore, it has been determined that merely failing to let the primer dry adequately and immediately applying the top coat composition will cause inferior results. The necessary degree of intermixing is preferably obtained through mechanical agitation at the surface, for example, by applying the top coat with a stiff bristle brush and using a vigorous scrubbing action to intermix the coating and the redissolved primer. The mechanical agitation produced by the vigorous brushing is continued until an adequate mixture is obtained. With the main primer being blood red and the HFC-55 coating being white an indication of adequate mixing is obtained from the color of the mixture, a satisfactory mixture of the two being a dark pink.

HFC-55 is cured or vulcanized by moisture from the surrounding air; hence relative humidity during application and cure is important and temperature must also be considered. The required cure time is 20 minutes to 1 hour between coats when the relative humidity and temperature are within the range of 30 to 50 percent and 70° to 80° F. If the subsequent coat can not be applied within this time period and the relative humidity is below 30 percent or the relative humidity is below 30 percent and the temperature below 70° F., it is recommended that the previous coat be allowed to cure for a minimum of 24 hours. This extended cure permits vulcanization to progress to a point that will prevent swelling and partial redissolving of the underlying coats when subsequent coats are applied.

It is most desirable to apply the coats continuously, allowing 20 minutes to 1 hour between coats within the 30 to 40 percent relative humidity and 70° to 80° F. temperature limits. If the relative humidity is below 30 percent and the temperature is above 70° F., 1 hour should be allowed between coats. If the relative humidity is between 50 and 70 percent and the temperature is above 70° F., 20 minutes should be allowed between coats. Coating application must be stopped if the relative humidity exceeds 70 percent, regardless of temperature. As long as the relative humidity remains within the required limits, temperatures above 70° to 80° F. are not detrimental to the coating as long as rapid evolution or flash off of the solvents within the coating does not occur, which results in the formation of pinholes. Coating can be continued to a minimum of 40° F. as long as the relative humidity is above 30 percent; however, a 1 hour drying time between coats must be allowed.

Having insured good adhesion between the primer and the first layer of top coat by virtue of the vigorous brushing action, subsequent layers of top coat are then added, with suitable drying time allowed between coats. Each coat is preferably applied to a dry film thickness of 2.5±0.2 mils. Fifteen coats of HFC-55 will provide a dry film thickness of approximately 37 mils. In addition to the HFC-55 top coat, another Gates Engineering Company product has desirable properties, that product being Gaco HFC-83-A, formulation number KV-19108. It has a specific gravity of 1.0200, weighs 8.51 pounds/gallon, contains 29.91 percent by weight solids or 18.72 percent by volume solids, and has a pigment volume concentration of 10.99 percent. These two Gaco products are of the same generic type and have identical curing processes. Hence, several layers of the two materials combine to produce a final coat having very desirable properties.

HFC-55 is more highly pigmented, harder and less permeable than HFC-83-A and is advantageously used as a moisture barrier beneath the HFC-83-A to prevent or greatly retard moisture permeation to the steel substrate. Both coatings exhibit resistance to high-velocity sea water impingement-erosion although the HFC-55, being harder, is the more resistant. The HFC-83-A, however, because of its greater resilience, exhibits far better resistance to cavitation-erosion. A top coat consisting of 10 mils of HFC-55 and 30 mils of HFC-83-A serves somewhat as a shock absorber for the relatively hard HFC-55, and protects it from the otherwise destructive effects of cavitation-erosion. Tests comparing this system with one of the best state of the art liquid neoprene coatings under conditions of severe cavitation have demonstrated the clear superiority of the coating formed in accordance with the invention.

HFC-83-A requires no thinning prior to application and is light grey in color while the HFC-55 is white. The viscosity of HFC-55 thinned 1:4 by volume with xylene is approximately the same as the viscosity of HFC-83-A and the application characteristics are very similar. The preferred dry film thickness per coat of HFC-83-A is 2.0 mils. The agitation and container-sealing requirements previously discussed for the main primer and HFC-55, and the temperature and relative humidity limitations described previously for HFC-55 also apply to HFC-83-A. The prescribed air drying time between coats of 20 minutes to 1 hour should be used for best results. Application of 15, successive 2-mil coats of HFC-83-A produces a total dry film thickness of approximately 30 mils.

The multilayer coating comprising the main primer and Gaco products HFC-55 and HFC-83-A must be adequately cured prior to immersion or exposure to marine service. Sufficient curing occurs at room temperature (approximately 70° F.) is approximately 14 days. If it is desired to expedite the cure, the curing process can be accelerated by air curing at 70° F. for at least 24 hours, followed by air curing at 150° F. for 24 hours. If the coated article is immersed or exposed before the materials have adequately cured, total failure or substantially reduced performance capabilities may result.

A schedule summarizing a preferred procedure for applying a neoprene coating system comprising 10 mils of the Gaco HFC-55 and 30 mils of Gaco HFC-83-A is presented in table I. While the entire multilayer coating is preferably applied in a continual manner, it is recognized that this may not always be possible. Accordingly, permissible stopping points in the procedure are given in table I.

TABLE I

| Application sequence | Remarks |
|---|---|
| Sand blast. Solvent wipe. Check surface cleanliness. | Apply wash primer as soon as possible after sand blasting is completed. Check cleanliness and rust bloom before priming. |

TABLE I — Continued

| Application sequence | Remarks |
|---|---|
| Apply 0.5±0.1 mil Formula 117 wash primer. | Tack rag before priming if surface was solvent wiped. Air dry for a minimum of one hour. Stopping point. Air dry for 24 hours maximum. |
| Apply 0.25±0.05 mil main.... | Kraft paper rub-down and tack ragging recommended if wash primer was spray applied. Brush apply, air dry for a minimum of two hours. Stopping point. Air dry for 24 hours maximum. |
| Apply first coat Gaco HFC-55. | Brush on vigorously, air dry as required.[1] |
| Apply second, third, and fourth coats of Gaco HFC-55. | Brush on smoothly, air dry as required.[1] |
| Apply first coat of Gaco HFC-83-A. | Brush on smoothly, air dry as required. Stopping point.[1] |
| Apply second through fifteenth coat of Gaco HFC-83-A. | Brush on smoothly, air dry as required. Stopping point after any coat. |
| Cure | Cure as required for maximum performance. |

[1] Coat continuously from first coat of HFC-55 through first coat of HFC-83-A unless stopping is absolutely necessary.

The following 180° peel test results indicate the extent of the superior adhesion achieved by the process of the invention. The 180° peel test is a measure of the force required to pull a 1-inch strip of the coating from the surface of a sample when the pulling force is exerted parallel to and adjacent the surface. A coating comprising Gaco N-18-F primer coating of 0.2-0.3 mil thickness and a liquid neoprene top coating of Gaco HFC-55 thinned 1:4 with xylene and vigorously intermixed with the primer exhibited a 180° peel test value after curing of greater than 68 pounds/inch of width. After immersion in 110° F. simulated sea water for 15 days, the value increased to greater than 92 pounds/inch of width. After 90 days of immersion, the value was greater than 86. The coating formed in accordance with the invention exhibits greater adherence after several days of immersion apparently because it undergoes further vulcanization at the elevated temperature. In contrast, a state-of-the-art liquid neoprene coating exhibited an initial 180° peel test value of greater than 60 pounds/inch of width, but after 15 days immersion in 110° F. simulated sea water showed only 38 pounds/inch of width and after 90 days, a value of only 10.

It must be emphasized that deviation from the procedures described herein for surface preparation and application of each coating component and designated as critical will cause the adherence of the final coating to the substrate in severe marine environments to be reduced from that level attained in accordance with the prescribed procedure. While a basic mode of practicing the invention, together with modifications thereof, has been described in detail, various further modifications of the surface preparation and application procedures and of coating components will occur to one skilled in the art without departing from the scope of the invention.

What is claimed is:

1. The method of adherently bonding a neoprene coating to a metal substrate comprising the steps of
    applying to the substrate a primer consisting essentially of a minor portion of a chlorinated rubber and a major portion of an epoxy resin both dissolved in an organic solvent and applied in a dried film thickness not exceeding 0.3 mil,
    allowing the primer to thoroughly dry,
    applying to the primer a liquid neoprene composition containing neoprene dissolved in 80.5–82.8 percent by volume of an organic solvent capable of dissolving the dried primer,
    intermixing the neoprene composition with the primer on the substrate so as to redissolve substantially all the primer, and
    allowing the resultant coating to dry and cure.

2. The method in accordance with claim 1 wherein the primer further comprises a minor portion of corrosion inhibiting pigment.

3. The method in accordance with claim 1 wherein the primer further comprises red iron oxide and lead silicochromate pigments.

4. The method in accordance with claim 1 wherein the liquid neoprene composition is applied to a dried film thickness of about 2 mils.

5. The method in accordance with claim 1 wherein the intermixing is accomplished by mechanical agitation.

6. The method in accordance with claim 5 wherein the mechanical agitation is produced by vigorous brushing.

* * * * *